(No Model.)
J. HILTON.
SEGMENT SAW.
No. 299,142. Patented May 27, 1884.
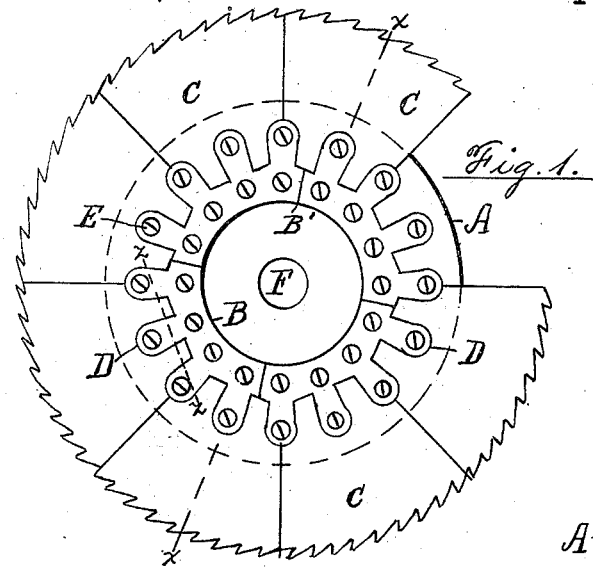
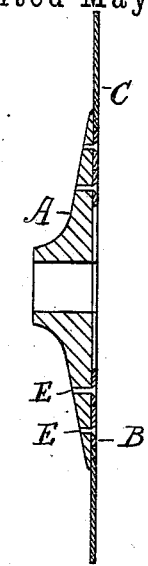
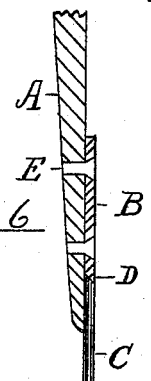
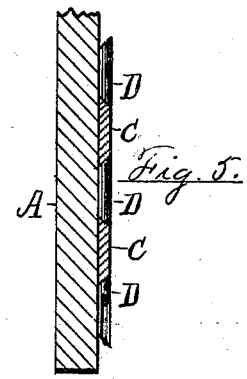
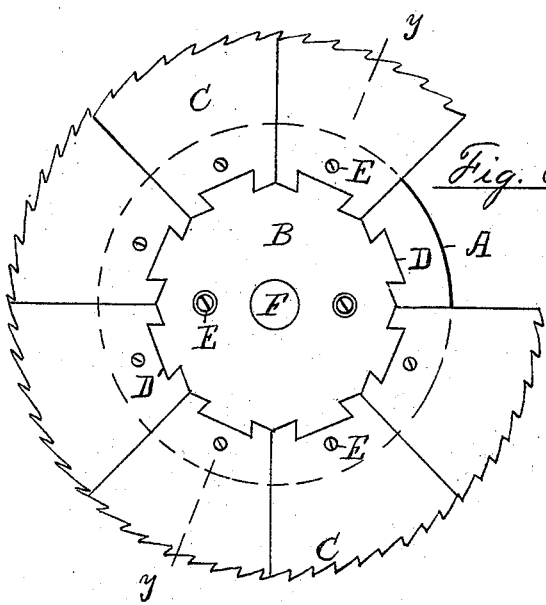
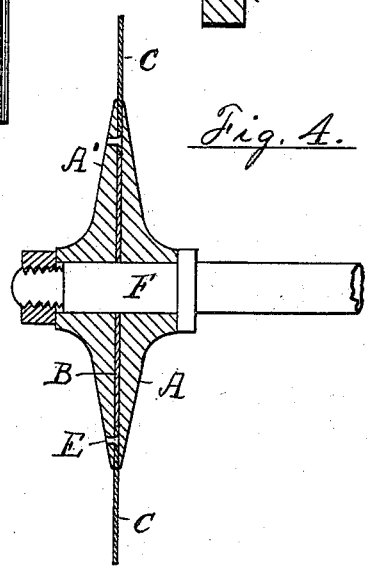
Attest:
Henry Theberath
J. W. Tillyer
Inventor.
James Hilton per
Thos. S. Crane, Atty.

UNITED STATES PATENT OFFICE.

JAMES HILTON, OF NEWARK, NEW JERSEY.

SEGMENT-SAW.

SPECIFICATION forming part of Letters Patent No. 299,142, dated May 27, 1884.

Application filed October 30, 1883. (No model.)

*To all whom it may concern:*

Be it known that I, JAMES HILTON, a citizen of the United States, residing in Newark, Essex county, New Jersey, have invented certain new and useful Improvements in Segment-Saws, fully described and represented in the following specification and the accompanying drawings, forming a part of the same.

This invention consists in the combination, with segments made of sheet metal and a supporting-flange, of a center plate or ring, of substantially the same thickness as the segments, and tongues connecting the segments with the center plate, as hereinafter claimed.

The invention is applicable to veneer-saws having a flange at but one side, as well as to reslitting-saws commonly made with a flange at both sides, and its nature will be understood by reference to the annexed drawings, in which—

Figure 1 represents the face side of a veneer-saw having one flange at the back. Fig. 2 is a section of the same on line $x\ x$ in Fig. 1, showing the beveled ends of the tongues D. Fig. 3 is a view of a saw with tongues of an alternative construction. Fig. 4 is a section of the same on line $y\ y$ in Fig. 3. Fig. 5 is an enlarged transverse section on line $z\ z$ of the tongues shown in Fig. 1, and Fig. 6 is a longitudinal section of one of the same.

A is the thick metallic flange for supporting the entire saw. B is the center plate. C C are the segments; D D, the tongues attaching the segments and plate, and E E screws for holding the segments to the flange. Such holding is done in the construction shown in Fig. 2 by inserting the screws through both the center plate and the segments; but in that shown in Fig. 1 the segments are held only by friction, the tongues being formed with dovetailed or beveled edges, as shown in the section in Fig. 5, whereby they draw the segments toward the flange. The tongues are intended to be the security for retaining the segments in place, and the screws shown inserted into the flange through the segments form no part of this invention, but could be used where the tongues were not made of dovetailed section to keep the segments upon the tongues, while the clamping-flange is placed against the segments and clamped thereto by the nut on the spindle in the usual manner when two flanges are used. Such a method of holding the segments and center plate together is shown in Fig. 4, and is adapted only for reslitting-saws; but where the saw is mounted upon only one flange for cutting veneers the tongues are constructed to hold the segments without any screws passing through the latter. The center plate is shown in Fig. 3 as extending all the way from the spindle F to the segments; but in Fig. 1 it is shown in the form of a ring made in four sections, touching each other at B', which construction saves a large amount of the sheet-steel in applying my invention to large saws, as those over four feet in diameter. The tongues are shown formed upon the center plate and projecting forward into slots formed in the inner sides of the segments, the tongues being wider at the end inserted in such slot, to lock the same in its place and prevent the withdrawal of the segments radially. In Fig. 3 the tongues are shown with sharp corners and angles; but these are objectionable in practice, and in Fig. 1 they are shown rounded at the outer end, so as to remove all sharp corners from the slots in the segments, which are most liable to crack at such corners, because subjected to a tempering process when finished.

The views in Figs. 5 and 6 are double the size of the same parts in Fig. 1, and show the tongues D to be sloped off or beveled on the side next the flange A in such manner as to draw the segments into close contact with the flange to hold them thereto by friction. This construction serves to hold the segments upon the face of a single saw-flange, A, without any screws passing through the segments, and affords a means of removing the segments from the flange by merely slacking the holding-screws E. Thus, when the screws in the tongues are slackened, their elasticity permits them to bend away from the flange when the segments are pulled in a radial direction, the wider end of the tongue slipping through the narrow end of the slot by pushing away from the flange. With this construction it is obviously unnecessary to remove any screws in changing a set of segments or in removing them from the saw, as all the segments can be pulled off of the holding-tongues by sufficiently slackening the screws in the ends of the latter.

No screws are shown in the tongues in Fig. 3, as the latter do not hold by friction or press the segments against the flange, the edges of the tongues and slots being fitted square and not beveled.

The saving in time in the use of my segment-holding construction is very great when it is necessary to change a set of segments on a large saw, as it ordinarily requires a half a day to do such work when all the segments are screwed fast, and the screws have to be entirely removed and replaced to effect the required change, while a mere slackening of the tongue-screws E suffices with my construction, when all the segments can be readily pulled off and others replaced. The tongues and slots are intended in all cases to be made interchangeable by the use of suitable punches and dies, and as any required shape can be cheaply produced by such means my improvement adds nothing material to the cost of a saw.

By the use of my beveled tongues the segment is held very rigidly against the saw-flange, and may therefore be made of thinner steel than if made of thick steel, as is usual at the point where weakened by the screw-holes, and ground down to the desired gage at the cutting-edge.

The difference in the weight of steel required for a fifty-inch saw by the ordinary mode of manufacture and mine is seventy-three pounds, or a gain of seventy per cent., as the steel is ordinarily used of No. 5 gage and weighs one hundred and eight pounds, the edge being ground down at great expense to the lower gage of No. 14. By my mode of construction I am able to make the segments and center plate all of No. 14 steel, weighing in all only thirty-five pounds, thus saving seventy-three pounds in one hundred and eight, the entire expense of grinding down the edges of the segments being also saved.

I claim—

1. The combination, in a segment-saw, of a flange, A, center plate, B, and segments C, the latter being secured to the former by the tongues and slots herein shown and described, and for the purpose set forth.

2. The combination of the flange A, center plate, B, having tongues D, secured thereto by screws E, and beveled on their edges, as described, and segments C, having slots fitted to the beveled edges of the tongues, and removable by sliding radially, as and for the purpose set forth.

3. The combination, with the center plate and segments united by tongues and slots, as described, of flanges clamped on both sides of the segments, as and for the purpose set forth.

In testimony whereof I have hereunto set my hand in the presence of two subscribing witnesses.

JAMES HILTON.

Witnesses:
   THOS. S. CRANE,
   J. W. TILLYER.